April 28, 1959     D. D. GILCHRIST     2,884,218
MIRROR BRACKET
Filed Oct. 25, 1956     2 Sheets-Sheet 1
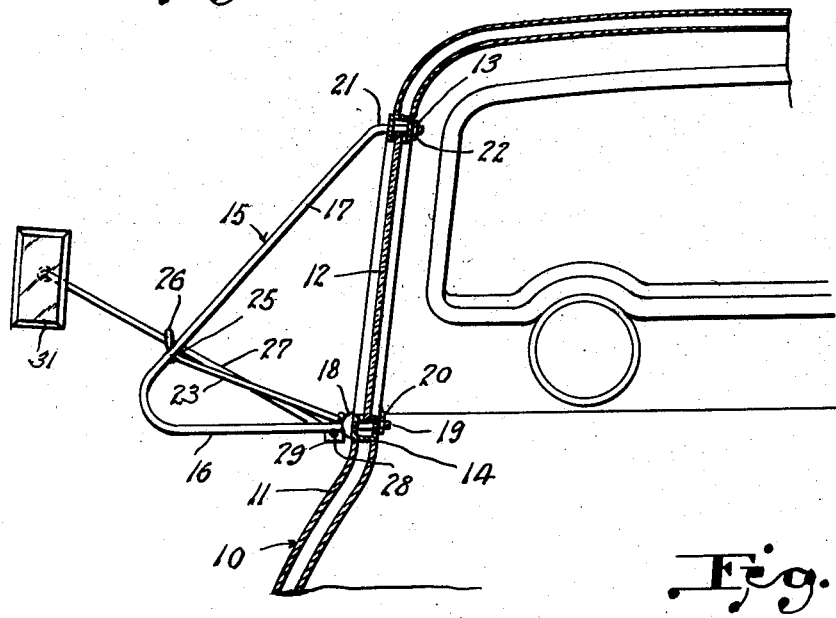
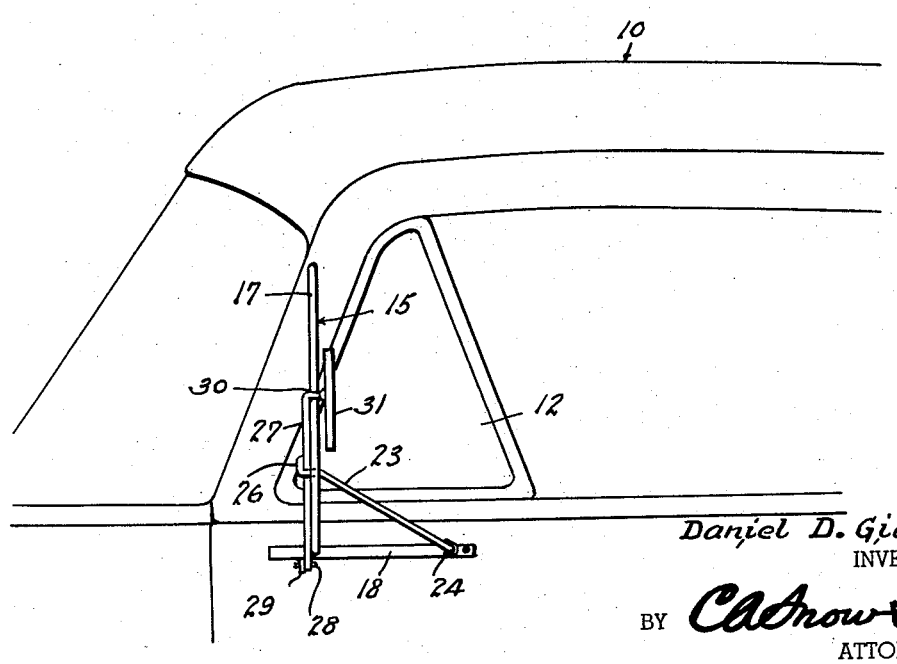
Daniel D. Gilchrist
INVENTOR
BY ATTORNEYS.

April 28, 1959  D. D. GILCHRIST  2,884,218
MIRROR BRACKET

Filed Oct. 25, 1956  2 Sheets-Sheet 2

Daniel D. Gilchrist
INVENTOR

BY
ATTORNEYS.

United States Patent Office 2,884,218
Patented Apr. 28, 1959

2,884,218

MIRROR BRACKET

Daniel D. Gilchrist, Penngrove, Calif.

Application October 25, 1956, Serial No. 618,312

1 Claim. (Cl. 248—291)

This invention relates to a mirror bracket adapted to be mounted on a side or door of a vehicle.

An object of this invention is to provide a bracket for mounting on a vehicle side or door whereby a rearview mirror may be selectively disposed in extended operative position or may be collapsed to an inoperative position.

Another object of this invention is to provide a combined bracket and mirror support adapted for mounting on a vehicle, the bracket being simple in construction and including a bracing bar for bracing the mirror carrying lever.

A further object of this invention is to provide a combined bracket and mirror support which is of simple construction so that the device may be produced at small cost.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a detail rear elevation of the mirror bracket constructed according to an embodiment of this invention, showing the bracket in applied and operative position on a vehicle which is fragmentarily shown in vertical section.

Fig. 3 is a detail outer side elevation of the bracket.

Figure 2:
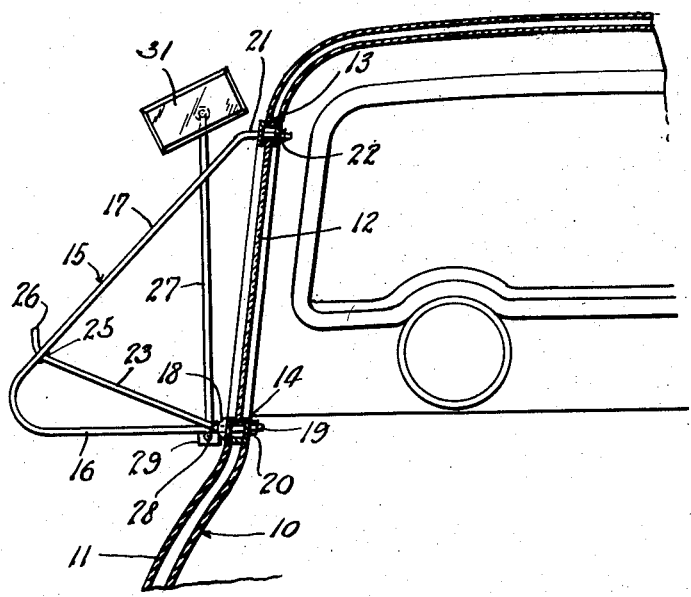
Fig. 2 is a view similar to Fig. 1 showing the mirror in inoperative position.

Referring to the drawings, the numeral 10 designates generally a vehicle having a door 11. The door 11 includes a glass panel 12 which is mounted in upper and lower U-shaped members 13 and 14, respectively.

In order to provide a means whereby the mirror may be supported for extension laterally of the door 11 of the vehicle, I have provided a bracket generally indicated at 15. The bracket 15 includes a lower horizontal bar 16 and an upwardly and inwardly inclined bar 17. The lower bar 16 is fixedly secured to a horizontal bar 18 and projects through the bar 18 in order that the projecting end 19 of the bar 16 may be extended through the door 11 or the channel 14. The inner end of the extension 19 is threaded and a nut 20 is threaded into the extension 19. The upper end of the bar 17 is angularly bent to form an extension 21 and this extension 21 projects through the upper channel member 13 and has a nut 22 threaded thereon.

Figure 4:
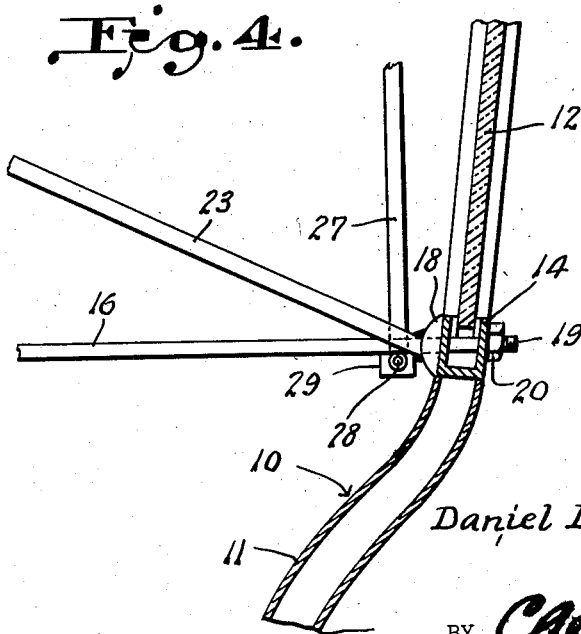
Fig. 4 is a fragmentary vertical section on an enlarged scale showing the bracket with the mirror in vertical inoperative position.

A bracing bar 23 is welded or otherwise fixedly secured as at 24, to the horizontal bar 18 and the outer end of the bracing bar 23 is welded or fixedly secured as at 25, to the lower portion of the bar 17. A hook-shaped keeper 26 is formed at the upper outer end of the bracing bar 23 and extends laterally of the bar 17. A mirror carrying lever 27 is pivotally secured on the pivot member 28 extending through a depending ear 29 which is fixed to the inner portion of bar 16. The lever 27 has a right-angularly disposed extension 30 at its outer end and a mirror 31 is secured to the extension 30. In the operative position of the mirror 31 lever 27 is swung outwardly and downwardly to a position for engagement with the keeper 26. In the inoperative position of the mirror lever 27 is swung upwardly to a substantially vertical position, as shown in Figs. 2 and 4.

The bracket hereinbefore described is adapted to be mounted on the side wall or door of a truck or other vehicle and the bracket provides a means whereby a rear view mirror may be disposed in either an operative or inoperative position. The bracket is of simple construction and can be readily mounted on various types of vehicles.

What is claimed is:

A bracket for a rear view mirror adapted to be connected to the side of a vehicle comprising a horizontal base bar, a second horizontal bar extending right angularly from one end of said base bar outwardly from the side of the vehicle, a threaded extension carried by said second bar projecting through said base bar adjacent one end and adapted to be extended through the vehicle side, a clamping nut threaded on said extension, a third bar upwardly and inwardly inclined relative to the side of the vehicle and integral with said second bar, a horizontal threaded extension integral with the upper end of said upwardly and inwardly inclined bar and adapted to be extended through the vehicle side, a bracing bar secured between the other end of said base bar and an intermediate point on said inclined bar, a hook-shaped keeper carried by said bracing bar and projecting laterally of said inclined bar, an elongated lever, means pivotally securing one end of said lever to said second bar adjacent the end of the latter adjacent to the side of the vehicle, said lever slidingly engaging along said inclined bar and engageable with said keeper, the free end of said lever being adapted to carry a mirror.

References Cited in the file of this patent

UNITED STATES PATENTS 2,642,244    Beach _____ June 16, 1953